United States Patent Office 3,632,543
Patented Jan. 4, 1972

3,632,543
PROCESS FOR PRODUCING A VINYLIDENE CHLORIDE CONTAINING ACRYLONITRILE POLYMER SOLUTION
Iyohiko Nakanome, Kenji Takeya, and Hiroshi Suzuki, Saidaiji, Japan, assignors to American Cyanamid Company, Stamford, Conn.
No Drawing. Filed May 2, 1969, Ser. No. 821,489
Claims priority, application Japan, May 28, 1968, 43/36,610
Int. Cl. C08f 45/24
U.S. Cl. 260—29.6 AN                                5 Claims

ABSTRACT OF THE DISCLOSURE

A monomer solution containing a mixture of at least 65% acrylonitrile, 5% to 35% vinylidene chloride, and up to 15% of at least one ethylenically unsaturated monomer copolymerizable therewith in a solvent medium containing 44% to 50% of a soluble thiocyanate salt, 40% to 46% water and 4% to 16% of at least one of a selected group of organic compounds, a process for forming a solution polymer by polymerization of the monomer solution, and a spinning solution for preparing fire-resistant acrylic fibers based on the solution polymer.

This invention relates to a monomer solution useful for forming a solution polymer, to a process for forming said solution polymer, and to a spinning solution of said polymer useful for forming fire-resistant fibers. More particularly, this invention relates to a monomer solution comprising at least 65% acrylonitrile and from 5% to 35% vinylidene chloride with other optional monomer content, to a process for forming a solution polymer therefrom, and to a spinning solution based on said solution polymer useful for forming fire-resistant fibers.

It has been disclosed previously that copolymers of acrylonitrile and vinylidene chloride are useful for forming fibers which are flame resistant, the degree of flame resistance increasing to some extent with increases in content of vinylidene chloride. Such polymers, however, are soluble only in special organic solvents such as dimethylformamide and γ-butyrolactone, and are not soluble in concentrated aqueous thiocyanate solutions. As a consequence, such polymers cannot be employed in fiber-forming processes wherein a concentrated aqueous thiocyanate solution is employed as polymer solvent.

British Pat. No. 643,198 and others disclose that acrylonitrile:vinylidene chloride copolymers containing in excess of 40% vinylidene chloride are generally soluble in both acetone and acetonitrile while other acrylonitrile polymers generally are not soluble in either solvent. However, copolymers of acrylonitrile:vinylidene chloride containing in excess of 40% vinylidene chloride when spun into fibers are deficient in certain textile properties such as strength, dry heat stability, and shrinkability by heat, when compared to other conventional acrylonitrile fibers. Accordingly, in order to obtain fibers having a high degree of flame resistance while retaining other desirable fiber properties, it is necessary that the copolymer contain more than 65% of acrylonitrile and, correspondingly, at least 5% but less than 35% of vinylidene chloride. However, a copolymer of such content is insoluble in acetone, acetonitrile, and concentrated aqueous thiocyanate solutions.

U.S. Pat. No. 2,486,943 and others teach solution polymerization of acrylonitrile alone or in combination with certain copolymerizable ethylenically unsaturated monomers employing concentrated aqueous thiocyanate solutions as solvent media. However, when vinylidene chloride is present as comonomer in amounts which can lead to desirable flame resistance in the polymer, the low solubility of vinylidene chloride in the medium results in non-uniform polymerization and, as a result, a non-uniform polymer which possesses unsatisfactory spinning characteristics.

In accordance with the present invention, there is disclosed a monomer solution comprising acrylonitrile as major monomer component, vinylidene chloride as minor monomer component, and, if desired, one or more additional monomer components in minor amounts, said monomers being dissolved in a solvent consisting of a concentrated aqueous thiocyanate solution and certain organic compounds soluble therein. There is also disclosed a process for preparing a solution polymer by polymerization of said monomer solution as well as a spinning solution for forming flame-resistant acrylonitrile fibers.

The monomer solution of the present invention is obtained by dissolving a monomer mixture containing at least 65% acrylonitrile, from 5% to 35% vinylidene chloride, and up to 15% of one or more ethylenically unsaturated monomers copolymerizable therewith, said percentages being by weight based on the total weight on the monomer mixture, in a solvent containing 44% to 50% of a soluble thiocyanate salt, 40% to 46% water, and 4% to 16% of at least one organic compound selected from the group consisting of methanol, ethanol, n-propanol, isopropanol, n-butanol, secondary-butanol, tertiary-butanol, diethylaminoethanol, acetone, acetylacetone, acetonitrile, tetrahydrofuran, and pyridine. The process aspect of the present invention involves polymerization of the above-described monomer solution. A further aspect of the present invention is the solution polymer which results and forms the basis for spinning flame-resistant acrylonitrile fibers.

Employing the solvent system disclosed above with the monomer content specified, there is achieved complete solution of the monomers thus enabling polymerization to proceed uniformly and produce a polymer solution of excellent spinning characteristics. Furthermore, since the formed polymer and monomers remain in complete solution as polymerization proceeds, the resulting copolymer is uniform in distribution of vinylidene chloride therein, and the desired properties of polymer and spinning solution are achieved.

It should be noted in the present invention that a solution is dealt with both with respect to the monomer mixture and the polymer formed. Thus, monomer usage in relation to solvent is such as to fulfill these requirements. In using the formed polymer solution as a spinning composition in fiber-making processes, useful polymer solids in solution may range from somewhat below 8% to as high as 40% or more. The present invention can supply polymer solutions of the required polymer solids content.

As previously indicated, the content of vinylidene chloride in the formed polymer should range between 5% and 35% by weight of the copolymer. When the content of vinylidene chloride is less than 5% on the basis given, no significant flame resistance is obtained. When the content of vinylidene chloride is in excess of 35%, fiber properties and spinning characteristics of the spinning solution are adversely affected. Preferably, a content of 12% to 35% of vinylidene chloride is employed.

It is not necessary to employ additional ethylenically unsaturated monomers in forming a copolymer of the present invention, but in many instances it is desirable to add one or more of such monomers to the mixture of acrylonitrile and vinylidene chloride to achieve certain advantages in fibers formed. In such instances the total weight of the ethylenically unsaturated monomer(s) should not exceed 15% of the total weight of the copolymer formed, which, as previously indicated will also contain at least 65% of acrylonitrile and an amount of vinylidene chloride which is in the range of 5% to 35% depending upon the amount of ethylenically unsaturated monomer(s) present, all percentages on the weight basis indicated. Use of ethylenically unsaturated monomers in excess of 15% on the basis indicated leads to adverse effects in fibers formed of the resulting polymer. Among the ethylenically unsaturated monomers that may be employed are included acrylic acid; methacrylic acid; esters such as methyl, ethyl, butyl, octyl, methoxymethyl, phenyl, cyclohexyl, and dimethylaminoethyl acrylates and methacrylates; acrylic acid amides, methacrylic acid amides and their N-alkyl counterparts; unsaturated ketones such as methylvinyl ketone, phenylvinyl ketone, and methylisopropenyl ketone; vinyl esters of saturated carboxylic acids such as vinyl formate, vinyl acetate, vinyl propionate, vinyl butyrate, vinyl thioacetate, and vinyl benzoate; N-alkylmaleimides; N-vinyl carbazole; N-vinylsuccinimide, N-vinylphthalimide; vinyl ethers; vinylpyridines such as 2-vinylpyridine, 4-vinylpyridine, and 2-methyl, 5-vinyl pyridine; styrene and its alkyl substituted counterparts; allyl alcohol; vinyl chloride; unsaturated sulfonic acids such as allyl sulfonic acid, methallylsulfonic acid, and styrenesulfonic acid and salts thereof, unsaturated aldehydes such as acrolein and methacrolein; and unsaturated phosphorus compounds such as diethylvinyl phosphonate and diphenylvinyl phosphonate.

The solution polymerization may be initiated with heat, sunlight, ultraviolet rays, or radioactive rays. Additions of sensitizers, polymerization initiators and polymerization accelerators such as benzoyl peroxide, di-tertiary butyl peroxide, benzophenone, benzaldehyde, and azobisisobutyronitrile may be made. However, such compounds as will decompose thiocyanate, such as hydrogen peroxide can not be employed.

Various other additives may be employed such as chain transfer agents to control molecular weight; stabilizers to prevent discoloration by addition of acid or alkali to control pH; and ultraviolet absorbers, thermostabilizers, and antistatic agents to provide desirable properties in fibers spun from the polymers thus obtained.

The polymerization reaction may be carried out over a temperature range between −70° C. to 150° C., but it is preferred to employ temperatures in the range of 0° C. to 80° C. It is also preferable to control the pH of polymerization to between 2 and 8. Suitable thiocyanates include sodium, potassium, calcium and ammonium thiocyanates.

The invention is illustrated by the examples which follow, in which percentages and parts are by weight unless otherwise indicated.

EXAMPLE 1

A solution polymer was prepared using a glass tank equipped with agitator and reflux condenser and maintained at 50° C. The monomer mixture charged was 75.1% acrylonitrile, 6.2% methyl acrylate, and 18.7% vinylidene chloride. The solvent was 46% sodium thiocyanate, 42.7% water, and 11.3% n-propanol. Azobisisobutyronitrile and sodium bisulfite each in the amount of 1% on the monomer charge were also added. The solution resulting was irradiated with ultraviolet rays from two high-voltage mercury lamps (HQ–2000–6G type, made by Japan Storage Battery Company) of 2 kilowatt size set at a distance of 5 centimeters from the tank. After 2 hours of polymerization there was obtained a transparent polymer solution containing a 79.1% polymer yield. The solution had a viscosity of 13,690 centipoises at 30° C. There was 13.69% polymer solids in solution having a polymer composition of 77.2% acrylonitrile, 5.7% methyl acrylate, and 17.1% vinylidene chloride.

The above-obtained polymer solution was spun into a coagulating bath of 12% aqueous sodium thiocyanate at 0° C. through a nozzle having 50 orifices of diameter 0.12 millimeter each. The spun fibers were water washed, stretched in boiling water to ten times their original length, dried at 115° C., wet-heated at 127° C., and hot-relaxed. During processing the fibers shrank 30.7% of the stretched length. The resulting fibers were of 15.69 denier size, had a tensile strength of 2.74 grams per denier, a knot strength of 2.42 grams per denier, tensile elongation of 42.3%, and knot elongation of 27.2%. The resulting properties are not substantially different from those of conventional acrylic fibers.

A well-opened sample of 2 grams of said fibers were placed in a 100 milliliter capacity beaker along with 20 milligrams of granular hexamethylene tetramine as igniter. The ignited fibers were self-extinguishing and about 15% of the fibers were burned by the igniter. In a corresponding test with fibers produced in the same manner from a polymer containing 90% acrylonitrile and 10% methyl acrylate, the ignited fibers were completely burned without evidence of self-extinguishing properties.

EXAMPLE 2

A 30 millimeter capacity test tube was used as a polymerization container. The monomer mixture was 15 parts of 82.3% acrylonitrile, 8.5% methyl acrylate, and 9.2% vinylidene chloride. The solvent was 85 parts of 44% sodium thiocyanate, 40.6% water, and 15.4% isopropanol. An addition of 1% on the weight of the monomer mixture of azobisisobutyronitrile was also made. Air in the upper part of the tube was replaced with nitrogen and the tube was sealed. The tube was placed in a water bath maintained at 50° C. The contents of the tube were irradiated with ultraviolet rays from a high voltage mercury lamp of 100 watts (UVL 3000 P type made by Ricoh Ltd.), the lamp being set in a position 100 centimeters from the tube and the tube contents were polymerized for 2 hours. A polymer in yield of 69.9% was obtained as a viscous transparent solution.

EXAMPLES 3–7

Following the procedure of Example 2, a series of polymerizations were conducted employing a different solvent medium in each instance. Benzaldehyde, 0.3% on the monomer mixture, was employed as photosensitizer for the monomer mixture which consisted of the following in each instance, 82.3% acrylonitrile, 8.5% methyl acrylate, and 9.2% vinylidene chloride. Solvent composition and results are given in Table I, which follows.

TABLE I

| Example number | Solvent composition | Percent | Polymer yield, percent | Intrinsic viscosity* | Appearance after polymerization |
|---|---|---|---|---|---|
| Comparative | Sodium thiocyanate<br>Water | 45<br>55 | 72.0 | 1.95 | Polymer grains, dispersed. |
| 3 | Sodium thiocyanate<br>Water<br>Ethanol | 48<br>44.3<br>7.7 | 65.8 | 1.72 | Clear solution. |
| 4 | Sodium thiocyanate<br>Water<br>Methanol | 48<br>44.3<br>7.7 | 65.8 | 2.11 | Do. |
| 5 | Sodium thiocyanate<br>Water<br>Diethylaminoethanol | 48<br>44.3<br>7.7 | 48.6 | 0.31 | Do. |
| 6 | Sodium thiocyanate<br>Water<br>Acetone | 50<br>46<br>4 | 41.5 | 2.62 | Do. |
| 7 | Sodium thiocyanate<br>Water<br>Acetonitrile | 44<br>40.6<br>15.4 | 32.7 | 1.65 | Do. |
| Comparative | Acetone | 100 | 20.0 | 0.93 | Polymer grains, dispersed. |

*As measured at 30° C. in dimethyl formamide.

EXAMPLE 8

(A) A monomer mixture consisting of 69.9% acrylonitrile, 5.1% methyl acrylate, and 25.0% vinylidene chloride was photopolymerized as a solution in a solvent mixture of 44% sodium thiocyanate, 40.6% water, and 15.4% n-propanol for 2 hours and 30 minutes following the procedure of Example 1. A polymer in 62.0% yield was obtained as a clear solution and had the composition 69.9% acrylonitrile, 3.7% methyl acrylate, and 26.4% vinylidene chloride. The molecular weight of the polymer, determined by application of the Staudinger equation and the viscosity measured in dimethyl formamide at 30° C., was 64,000.

The resulting polymer solution was spun into a coagulating bath of 12% aqueous sodium thiocyanate at 0° C. through a nozzle of 50 orifices of 0.12 millimeter diameter each. The resulting fibers were water washed, stretched in boiling water to 10 times their original length, and then wet-heat relaxed at 130° C. to obtain a size of 15 deniers.

(B) A conventional continuous dispersion polymerization procedure was followed in preparing a polymer, using a temperature of 50° C. and an average residence time of 50 minutes. The monomer feed consisted of 68% acrylonitrile, 27% vinylidene chloride, and 5% methyl acrylate and amounted to 31% of the total feed. A redox polymerization initiator feed of sodium chlorate and sodium sulfite in aqueous solution was employed in such proportions that 0.25 part of sodium chlorate was used per 100 parts of monomer and 20 mols of sodium sulfite were used per mole of sodium chlorate. Aqueous nitric acid was also employed in an amount sufficient to maintain the pH in the reactor between 2.8 and 3.0. Additional water was added as required. The resulting polymer had a composition of 74.2% acrylonitrile, 20.5% vinylidene chloride, and 5.3% methyl acrylate and a molecular weight of 55,000. Attempts to prepare a spinning solution of the polymer by adding 15 parts thereof to 85 parts of a solvent consisting of 44% sodium thiocyanate, 40.6% water, and 15.4% n-propanol resulted in incomplete solution and a cloudy appearance. Spinning of this composition into a 12% aqueous solution of sodium thiocyanate at 0° C. through a nozzle of 50 orifices of diameter 0.12 millimeter each resulted in such numerous thread breaks as to make spinnability extremely poor.

EXAMPLE 9

Following the procedure of Example 2, 15 parts of a monomer mixture consisting of 75.7% acrylonitrile, 6.3% methyl acrylate, and 18.0% vinylidene chloride was dissolved in 85 parts of a solvent consisting of 45.9% sodium thiocyanate, 42.6% water, 11.2% n-propanol and 0.3% isopropanol. Azobisisobutyronitrile, 0.1%, and triethyl phosphite, 1%, both based on the monomer mixture were added to the solution, which was then solution photopolymerized to a clear solution with a polymer yield of 72.2%. The viscosity of the solution was 3600 centipoises at 30° C. and the intrinsic viscosity of the polymer was 1.38 measured at 30° C. in dimethyl formamide. The solution had excellent spinning characteristics.

EXAMPLE 10

Following the procedure of Example 2, 15 parts of a monomer mixture of 70% acrylonitrile and 30% vinylidene chloride was dissolved in 85 parts of a solvent consisting of 46% sodium thiocyanate, 42.7% water, and 11.3% n-propanol. Azobisisobutyronitrile, 1.0%, sodium bisulfite, 1.0%, and dibutyltin diacetate, 3.0% all based on the monomer mixture, were added to the solution, which was solution photopolymerized at 40° C. to yield a clear solution. A polymer yield of 79.3% was obtained. The solution had a viscosity of 100 centipoises at 30° C. and the intrinsic viscosity of the polymer was 0.90 measured at 30° C. in dimethyl formamide. The solution had excellent spinning characteristics.

EXAMPLE 11

In a polymerization tank of hard glass equipped with agitator and reflux condenser and maintained at 45° C. in an automatic heating bath was placed 15 parts of a monomer mixture consisting of 80% acrylonitrile, 10% vinylidene chloride, and 10% vinyl acetate dissolved in 85 parts of a solvent consisting of 46% sodium thiocyanate, 42.7% water, and 11.3% n-propanol. Azobisisobutyronitrile, 0.5% based on the monomer mixture, was added to the solution, which was then solution photopolymerized for 10 hours. A clear polymer solution resulted with a polymer yield of 36.8%. The viscosity of the solution was 9400 centipoises at 30° C.

EXAMPLE 12

Following the procedure of Example 2, 15 parts of a monomer mixture of 80% acrylonitrile, 9% methyl acrylate, 10% vinylidene chloride, and 1% sodium methallylsulfonate was dissolved in 85 parts of a solvent consisting of 46% sodium thiocyanate, 42.7% water, and 11.3% n-propanol. Azobisisobutyronitrile, 1%, and sodium bisulfite, 1%, both based on the monomer mixture were added to the solution, which was then solution photopolymerized at 40° C. A clear polymer solution resulted which had excellent spinning characteristics. The viscosity of the solution was 900 centipoises at 30° C. and the intrinsic viscosity of the polymer was 1.70 at 30° C. in dimethyl formamide.

What is claimed is:

1. A monomer solution for forming a polymer which consists essentially of (A) a monomer mixture consisting essentially of at least 65% acrylonitrile, from 5% to 35% vinylidene chloride, and up to 15% of at least one ethylenically unsaturated monomer copolymerizable therewith, said percentages totaling 100% and being by weight based on the total weight of the monomer mixture, and (B) a solvent consisting essentially of 44% to 50% of sodium, potassium, calcium, or ammonium thiocyanate, 40% to 46% of water, and 4% to 16% of methanol, ethanol, n-propanol, isopropanol, n-butanol, secondary-butanol, tertiary-butanol, diethylaminoethanol, acetone, acetylacetone, acetonitrile, tetrahydrofuran, or pyridine, the latter percentages totaling 100% and being by weight based on the total weight of solvent, said (A) constituting from about 8% to about 40%, by weight, of the total weight of said (A) and said (B).

2. The solution of claim 1 wherein the monomer mixture contains at least 12% vinylidene chloride.

3. The solution of claim 1 wherein the monomer mixture contains from 12% to 30% vinylidene chloride and from 5% to 10% methyl acrylate.

4. A process for preparing a polymer which comprises polymerizing at a temperature in the range of −70° C. to 150° C. and at a pH in the range of 2 to 8 a monomer mixture consisting essentially of (A) at least 65% acrylonitrile, from 5% to 35% vinylidene chloride, and up to 15% of at least one ethylenically unsaturated monomer copolymerizable therewith, said percentages totaling 100% and being by weight based on the total weight of the monomer mixture in (B) a solvent consisting essentially of 44% to 50% of sodium, potassium, calcium, or ammonium thiocyanate, 40% to 46% of water, and 4% to 16% of methanol, ethanol, n-propanol, isopropanol, n-butanol, secondary-butanol, tertiary-butanol, diethylaminoethanol, acetone, acetylacetone, acetonitrile, tetrahydrofuran, or pyridine, the latter percentages totaling 100% and being by weight based on the total weight of solvent, said (A) constituting from about 8% to about 40%, by weight, of the total weight of said (A) and said (B).

5. The process of claim 4 wherein in addition to said (A) and said (B) there is present benzoyl peroxide, di-tertiary butyl peroxide, benzophenone, benzaldehyde, or azobisbutyronitrile.

References Cited
UNITED STATES PATENTS

| | | | |
|---|---|---|---|
| 2,486,943 | 11/1949 | Hammer et al. | 204—159.22 |
| 2,648,647 | 8/1953 | Stanton | 260—29.6 |
| 3,194,862 | 7/1965 | Coover et al. | 260—29.6 |
| 3,274,140 | 9/1966 | Brealey | 260—29.6 |
| 3,297,613 | 1/1967 | Gibbs | 204—159.22 |
| 3,368,993 | 2/1968 | Nakajima et al. | 260—29.6 |

HAROLD D. ANDERSON, Primary Examiner

U.S. Cl. X.R.

204—159.22; 260—29.6 T, 29.6 TA